United States Patent [19]

McQueen

[11] Patent Number: 5,221,916

[45] Date of Patent: * Jun. 22, 1993

[54] HEATED EXTENDED RESISTANCE TEMPERATURE SENSOR

[75] Inventor: Malcolm M. McQueen, Fallbrook, Calif.

[73] Assignee: Fluid Components, Inc., San Marcos, Calif.

[*] Notice: The portion of the term of this patent subsequent to Feb. 19, 2008 has been disclaimed.

[21] Appl. No.: 924,675

[22] Filed: Aug. 4, 1992

Related U.S. Application Data

[60] Division of Ser. No. 366,582, Jun. 15, 1989, Pat. No. 5,134,772, which is a continuation-in-part of Ser. No. 189,387, May 2, 1988, Pat. No. 4,994,780.

[51] Int. Cl.$^5$ .............................................. H01C 7/10
[52] U.S. Cl. .................................. 338/24; 338/22 R; 219/544; 29/611; 29/613; 374/183
[58] Field of Search ................... 338/24, 22 R, 25-30; 219/544, 546, 548; 374/185, 204; 73/292, 295

[56] References Cited

U.S. PATENT DOCUMENTS

2,470,653  5/1949  Schulman et al. .................... 338/28

*Primary Examiner*—Marvin M. Lateef
*Attorney, Agent, or Firm*—Baker, Maxham, Jester & Meador

[57] ABSTRACT

An extended resistance temperature sensor formed of a plurality of lengths of pre-insulated resistance temperature detector (RTD) wire. The RTD wire is either unheated, self heated, alternatingly self heated or is heated by means of strands of heater wire integrated with or placed closely adjacent to the RTD wire. The RTD wire itself, or together with the heater wire, is bonded together in one elongated embodiment. Alternatively the RTD wire, or with the heater wire, may be encased in insulated shrink tubing, thin wall metal tubing or both. Connectors are provided at each end of the elongated structure to supply electrical current for heating purposes or to connect the RTD wire to detection circuitry, or both, and the configuration of RTD wire is doubled back on itself to form a U-shaped structure with the connectors adjacent each other. Protective sheaths are provided over the connectors.

18 Claims, 5 Drawing Sheets

HEATED EXTENDED RESISTANCE TEMPERATURE SENSOR

This application is a divisional application of copending application Ser. No. 366,582 filed on Jun. 15, 1889, now U.S. Pat. No. 5,134,772, which is a continuation-in-part of Ser. No. 189,387, filed May 2, 1988, now U.S. Pat. No. 4,994,780.

FIELD OF THE INVENTION

This invention relates generally to electrical resistance temperature sensors and more particularly to a long, slender sensor capable of sensing continuously over an extended field, the sensing element of the sensor being continuous, insulated resistance temperature detector (RTD) wire formed in a bundle of parallel strands.

BACKGROUND OF THE INVENTION

Both thermocouples and RTD's are in widespread use for sensing temperature and providing an electrical output representative of the temperature sensed. Thermocouples, by their nature, are point sensors because they thermoelectrically produce an electromotive force at a specific junction between two different materials. RTD's employ a wire sensing element which has a resistance which varies with temperature. Most RTD's are now designed to concentrate the electrical resistance to a small point or in the smallest possible volume, with miniaturization being a principle feature so that RTD's are, like thermocouples, essentially point sensors. Because of this point sensing feature, whenever an extended field is to be interrogated for temperature with the use of either thermocouples or RTD's, it has generally been necessary to distribute a multiplicity of thermocouples or RTD's. When thermal dispersion flow rate sensors or liquid quantity gauging sensors are used, it has been necessary to deploy a multiplicity of differentially heated differential RTD's or thermocouples. The heat loss or thermal dispersion rate is measured at the discrete points where the differential temperature is being sensed.

No matter how many point sensing thermocouples or RTD's are distributed in the field, they are unable to provide an accurate, true analog representation of the information to be determined from the field because they are still only sensing specific points. Determining the best points to interrogate, installing the individual sensor elements, and making the numerous required individual electrical connections to the point sensing elements in accordance with the generally accepted technology, are cumbersome and expensive steps.

There are many situations where it is desirable to sense temperature, level or flow rate over an extended field. This has been accomplished to a certain degree with thermocouples and RTD's by converting the point sensing reading to an average temperature or differential temperature of the field. However, the larger such a thermal field is, and the more varied the temperatures are across the field, the more point sensing elements are required to obtain a readout which is reasonably representative of the average condition of the sensed field.

One situation where extended field interrogation is currently made with thermocouples or RTD's involves gauging of the fluid level, or the location of a phase change interface such as between liquid and gas, in a vessel such as a tank. This type of level gauging can currently be accomplished with thermocouples and RTD's by arranging a series of spaced sensor elements along the height of the tank, that is, at vertically separated points in the field being interrogated. In the case of RTD's, a series of heated RTD's and companion differential temperature reference RTD's are employed along the height of the tank. As liquid reaches each companion RTD point sensor, the sensor reports that it is wet when the heated RTD is cooled by the higher thermal dispersion rate of the liquid than is the case for the air or gas phase above the surface of the liquid. However, the operator is unable, with such point sensing structure, to determine whether the liquid level is just at that particular point or at any level between that point and just below the next higher RTD sensing point. Further filling of the tank will result in discrete reports from the sequentially higher RTD's, while lowering of the liquid level will cause successive discrete reports from the successively lower RTD's as they are uncovered from the liquid. For example, if ten sensing points are employed along the height of the tank, each with an individual heated RTD sensor and a reference RTD sensor, the gauging can only be performed at ten individual step points with unresolvable uncertainty of where the liquid level is between any two of those points. The only way to reduce such uncertainty when employing point sensors is to increase the number of sensing elements, at correspondingly increased expense, cumbersome wire connections and possibly reduced reliability.

Accurate liquid level sensing is of critical importance in any liquid storage vessels and particularly in reactor buildings of nuclear power plants, as well as in the reactor vessels themselves. This accurate liquid level sensing is important in avoiding nuclear power plant accidents which could be caused when the actual level of the liquid is either not properly known or is misinterpreted. In addition to lack of desired accuracy, liquid level changes are not immediately sensed when point sensors are used since there can be considerable change in liquid level prior to detection by the next sensing element which is either covered or uncovered. Thus, a developing problem or trend may not be immediately detected and the desirable mitigating action to suppress or correct the problem cannot be taken in as timely a manner as may be desirable or necessary.

Each of the vertical sequence of thermocouples or RTD's in such a liquid level gauging system requires its own separate electrical connections to the detection circuitry. The thereby required large number of joints or splices can result in undesirably low reliability, which could be especially dangerous in the environment of a nuclear power plant. As an example of this problem, there is in existence a point-sensing RTD system for water level sensing in a nuclear reactor building which has approximately fifty RTD sensors arrayed over a vertical height of about sixty feet.

RTD's are preferred for some purposes over thermocouples because they can be made more sensitive, being able to provide an output signal many times greater than is generally possible with thermocouples. This is primarily because RTD's operate with an external electrical power source which can provide as high a level of voltage or current as is desired. Thermocouples operate on the basis of a self-generated junction electromotive force (emf) which inherently has a very low output voltage level as well as other inaccuracies.

For sensing in some extended fields, such as the inside of a nuclear reactor vessel, access may be relatively difficult and may be best achieved by encasing a series of sensors in a long, slender, tubular probe. Such a probe can be readily inserted in an existing reactor vessel instrument guide tube. RTD's are desirable in such situations because of their high output and therefore high sensitivity but many prior art RTD's are not suitable for such packaging, being too bulky and having a ceramic or a glass insulator too brittle to allow them to be deformed as would be required for packaging in a long, slender, tubular probe.

On the other hand, thermocouples have been packaged inside a metal casing as small as 0.01 inch in diameter. A series of such encased thermocouples and the required electrical leads may be placed inside a tube and encased by drawing or swaging the tube down around the thermocouples and leads to produce a long slender probe suitable for gaining access in restricted regions inside a nuclear reactor vessel. This advantage for the thermocouples is balanced by at least one equivalent disadvantage. Thermocouples are relatively delicate and are easily subject to breakage during the manufacture of such probes or upon accidental impacting. Of course, as discussed above, a thermocouple being a point sensor, thermocouple probes necessarily have a step function output rather than a continuous output, so the accuracy of liquid level determination is limited. Additionally, the electrical output of thermocouples is so small that performance is grainy and resolution and accuracy are relatively poor. Because individual wire leads are required for each thermocouple, numerous wires must extend along the probe, thereby limiting how small the outside diameter of a tubular probe can be. Of course, the greater the number of thermocouples placed along the probe in any attempt to increase resolution the greater the number of leads. This large number of leads also seriously reduces the reliability of thermocouple-type probes. Thermocouple probes are relatively expensive to make, especially considering the number of leads, connections and electronic cooperating devices required for such probes.

Another example of an extended field which has been interrogated by a multiplicity of RTD's or thermocouple sensors, is a large duct having a non-uniform flow profile, where it is sought to obtain an average reading of the flow velocity in the duct. Such non-uniform flow distributions exist, for example, in air ducts where diameters are large and fittings such as tees, elbows, transitions, bends, section changes, louvers, dampers and the like cause flow disturbances. Non-uniform flow distributions also typically occur in the input air ducts and combustion output ducts of fossil fuel power plants In such cases, a multiplicity of point sensing elements is placed at what are considered to be strategic locations across the gas flow path, but only a rough approximation of the flowable velocity can be obtained by the use of such discrete, point sensing locations. As stated previously, a large number of individual point sensors results in high costs due to the number of leads, connectors and mating electronic devices that are necessary to cooperate in interpreting the individual signals.

SUMMARY OF THE INVENTION

It is an object of this invention to provide an elongated sensor formed of RTD wire suitable for interrogating an extended field. Broadly speaking, the sensor of this invention comprises a plurality of strands of pre-insulated RTD wire arranged in a series of one or more interconnected loops and having means to bundle or encase the strands in a protective sheath and means to connect the RTD wire to detector circuitry and selectively to electrical current for self heating purposes. An alternative embodiment employs a separate pre-insulated heating wire also having one or more interconnected strands and arranged closely adjacent to or intermingled with the insulated RTD wire. In that case the electrical current would be applied to the heating wire for generating the desired heat.

This invention is an improvement over that shown in applicant's U.S. Pat. No. 4,977,395, for another type of distributed RTD sensor. Because the manner in which this sensor is used is equivalent to that of the earlier sensor, reference to the other application will be made several times hereinbelow.

The extended resistance temperature sensor may take the form of the strands of pre-insulated sensor wire bonded together to form a semi-rigid elongated sensor or the strands of pre-insulated sensor wire may be encased in shrink tubing or small diameter thin wall metal tubing. In another alternative embodiment, either the sensor or the heater wires are in elongated form and the heater or sensor wires are wrapped around the elongated wires in spiral fashion. This embodiment may either be enclosed in shrink tubing, thin wall metal tubing or without any protective sleeve or tubing.

BRIEF DESCRIPTION OF THE DRAWINGS

The objects, advantages and features of this invention will be more readily perceived from the following detailed description when read in conjunction with the accompanying drawing, in which.

DESCRIPTION OF THE PREFERRED EMBODIMENTS

Figures 1, 2, 4:
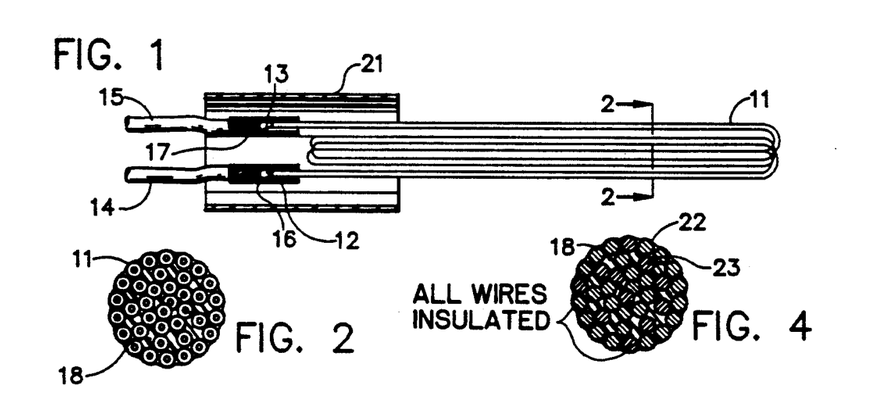
FIG. 1 shows a sensor of this invention in its basic form.
FIG. 2 is a cross section through cutting plane 2—2 of FIG. 1.
FIG. 4 is a cross section showing how the heater and sensor wires of FIG. 3 may be randomly intermingled in a preferred embodiment.

With reference now to the drawing and more particularly to FIGS. 1 and 2 thereof, there is shown a sensor constructed in accordance with the invention. The sensor is formed of a multiplicity of strands of pre-insulated RTD wire 11. Ends 12 and 13 of the sensor wire are connected by appropriate means such as welding or soldering to stranded lead wires 14 and 15, respectively. For physical and electrical protection, a short piece of small insulator shrink tubing 16 and 17, respectively, is secured tightly over each connection of the sensor wire and the stranded lead wire. In this embodiment, another piece of shrink tubing or a metal outer sheath 21 is secured over the RTD wire connections to the stranded lead wires as shown in the drawing. Of course, any relatively close encasement element could perform the desired function of the small insulators or the outer sheath without necessarily being shrink tubing.

Strands or segments of sensor wires 11 are formed as a bundle as shown in FIG. 2. The sensor wire segments all have an insulative coating as shown. That is true of all embodiments of this invention. For drawing clarity, this insulation is not specifically depicted in other figures. These wires are bonded together with suitable material 18 as rubber, ceramic, plastic, an appropriate potting compound, varnish or the like, to form the otherwise unsupported, semi-rigid, elongated sensor. The bundle is preferably round, as shown in FIG. 2, but it may take on other forms such as square, triangular, rectangular, hexagonal or other desired cross sections.

Figure 3:
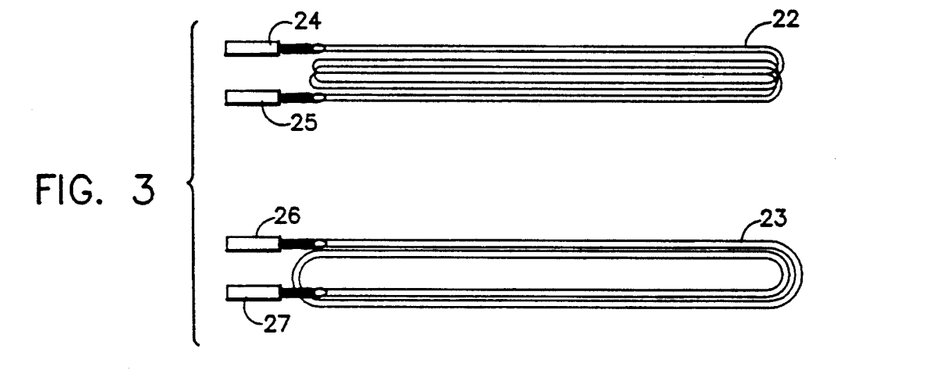
FIG. 3 shows a sensor of the invention with pre-insulated sensor wire and pre-insulated heater wire shown in spaced relationship for expository purposes.
Figure 9:
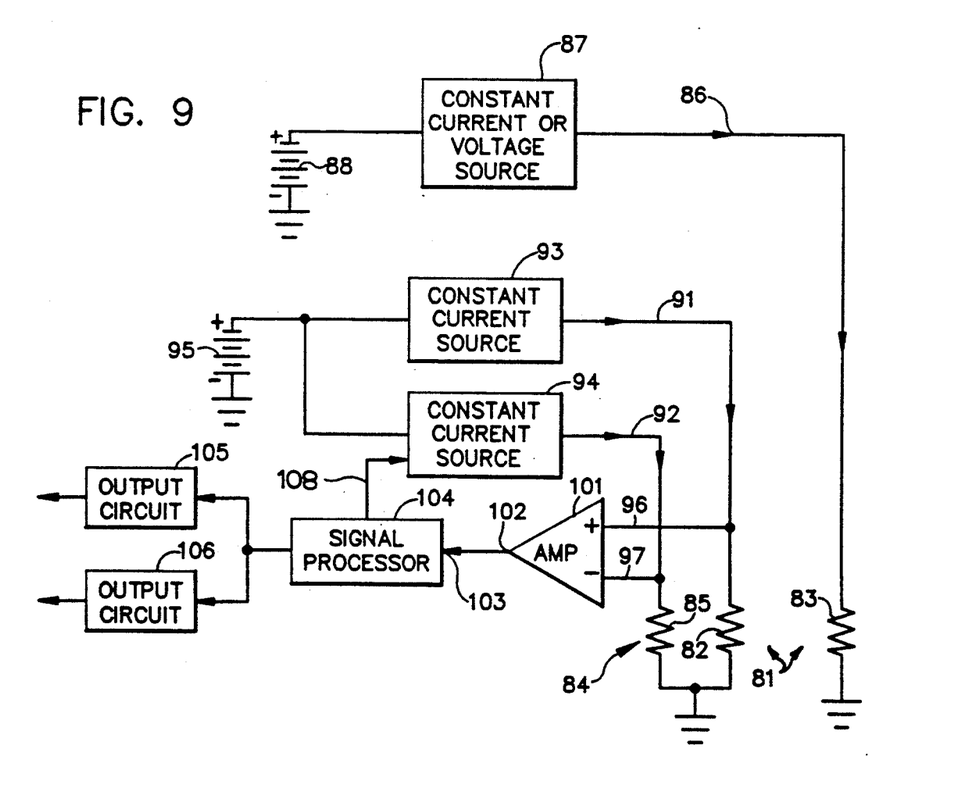
FIG. 9 is an example of the electrical circuitry with which the sensors of FIGS. 1-8 may be employed.

The configuration of FIGS. 3 and 4 is similar except that in addition to the sensor wire 22 there are strands of pre-insulated heater wire 23. The sensor and heater wire strands would be closely adjacent or randomly intermingled in actual practice but are shown separated in FIG. 3 to avoid confusion. This preferred configuration requires that there be four connectors to lead wires 24, 25, 26 and 27, which connections would be treated in the same way as are the connector ends of the embodiment of FIG. 1. That is, each connection between the stranded lead wire and the end of the heater or sensor wire is protected by a small piece of shrink tubing or other protective material and then the whole combination of four connections would normally be encased in a short length of shrink tubing or a metal outer sheath. It is preferred that the heater wires be intermingled with the RTD wires as depicted by the FIG. 4 cross section. However, they may be arranged in any relationship which would effectuate the desired result. As shown in FIG. 9, there may be common ground points for the sensor and heater. For example, lead wires 25 and 27 in FIG. 3 could be connected together.

In forming the sensor as shown in any of FIGS. 1-4, the pre-insulated sensor or sensor and heater wires are formed in a bundle, pre-impregnated with the bonding material and pulled through a heated or unheated forming dye to compact, de-aerate and form the finished semi-rigid bundle.

Figure 5:
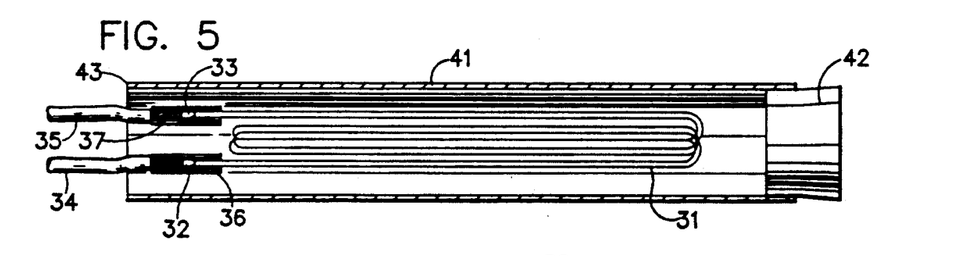
FIG. 5 is a view similar to FIG. 1 showing the pre-insulated sensor wire encased in small diameter thin wall metal tubing prior to reducing the tube diameter.

With respect to FIG. 5, multiple strands of pre-insulated sensor wire 31 are formed as in FIG. 1 except that they are not bonded together. Ends 32 and 33 are connected to respective stranded lead wires 34 and 35 by welding or soldering and they are enclosed by small shrink tubing elements 36 and 37 respectively. Or as discussed above, other insulative protective material or structure could be used. In this embodiment, the entire combination of sensor wires and connections to the lead wires is encased in a small diameter thin wall metal tube 41 to provide the necessary degree of rigidity and self support. The end of the tube opposite to the lead wires is closed by means of seal plug 42 formed of suitable material such as metal or plastic which the tubing securely engages after it has been drawn down to minimum size. The seal plug is shown oversized in FIG. 5 to depict closure of the end of the tube. In the preferred embodiment it would actually be smaller to close the end of the reduced diameter tube. Likewise, end 43 of the protective sheath or tubing securely engages the stranded lead wires 34, 35 and the connections encased in shrink tubing 36 and 37.

Figure 6:
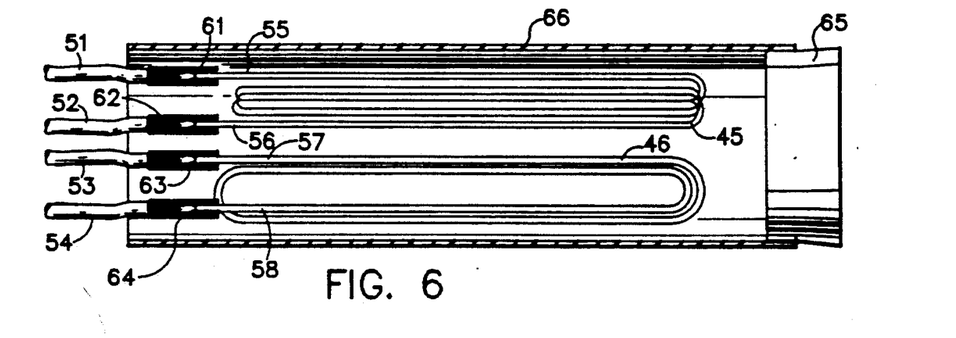
FIG. 6 shows the sensor wire combination of FIG. 3 encased in plastic shrink tubing but with the sensor and heater wires shown somewhat spaced to aid in depiction and prior to shrinking the tubing.

FIG. 6 is an embodiment much like that shown in FIG. 3 with shrink tubing insulator sleeve 66 encasing the sensor and heater wires as discussed with respect to FIG. 5. Although shown in spaced configuration, pre-insulated sensor wire 45 is preferably intermingled with heater wire 46. The ends of the respective wires 55, 56 and 57, 58 are connected to lead wires 51, 52 and 53, 54 respectively, the connections being encased as shown in small shrink tubing elements 61, 62, 63 and 64. Seal plug 65 is provided at the end opposite the connectors and shrink tubing 66 closes around the seal plug and around the connector ends as described previously.

FIGS. 5 and 6 disclose the alternatives of metal or plastic shrink tubing surrounding the sensor and heater wire strands. Plastic shrink tubing is normally activated by the application of heat. The metal tubing of FIG. 5 can be forged to the desired small diameter by drawing it through dies or by hammering it in forming dies. This action will compact the sensor wires or the sensor and heater wire strands in much the same way as heating the plastic shrink tubing does. Alternatively, the voids in the bundle of wire strands can be filled by forcing suitable potting compound in one end of the tube before plug 42 is put into place. This has the effect of providing uniform heat transfer from the wire bundle to the sheath and thence to the environment. A combination of potting and shrinking can also be employed. Finally, metal shrink tubing is also available for such uses. It functions in much the same way as does plastic shrink tubing in compressing the sensor and heater wire bundle for superior mechanical, thermal and electrical properties. Note that the metal tube can also be used as a heater or even as the RTD. If used as a heater, the RTD would be wire bundle 31. If the metal tube is used as the RTD, bundle 31 would be the heater. Suitable insulative connections would need to be made to tube 41 in either case.

The metal tubing can be coated or plated to promote better chemical resistance. Not shown is a combination of shrink tubing and thin walled metal sheaths over the shrink tubing.

Figure 7:
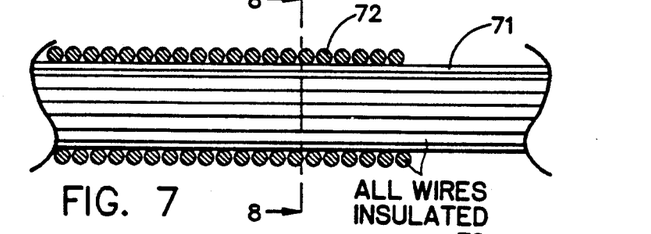
FIG. 7 is an alternative embodiment with one type of pre-insulated wire in elongated multi-strand form and the other type of pre-insulated wire, either sensor or heater wire, being wrapped around it in spiral fashion.
Figure 8:
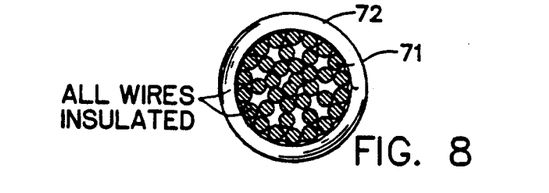
FIG. 8 is a cross section through cutting plane 8—8 of FIG. 7.

An alternative embodiment is shown in FIGS. 7 and 8. In this instance, either the pre-insulated heater wire or the pre-insulated sensor wire is in the elongated form discussed with respect to FIGS. 1-6 while the other of either the sensor wire or heater wire is coiled around the elongated strands of the wire in a helical configuration. Assuming for purposes of illustration that the elongated wire is heater wire 71 and that the coiled pre-insulated wire is sensor wire 72. The end connections would be sheathed in the same manner as has previously been discussed. The effective length of the RTD filament is greatly increased for increase of sensitivity and resolution by arranging the RTD filament in this long, thin, helical form. The helical form for either the sensor or the heater also adds the advantage of adjusting the amount of wire in each linear pass. For examples, if for electrical reasons it is necessary to get resistance equal to $2\frac{1}{2}$ linear passes, the helical winding could be adjusted so that $1\frac{1}{2}$ times the resistance of a single linear pass could be arranged for in the helical portion plus one straight pass of wire in the return lead. The entire sensor configuration of FIG. 8, as shown in FIG. 7, may be enclosed in shrink tubing or in thin wall metal tubing or it may be merely bonded together and left in the form shown in FIGS. 7 and 8, as is true of the embodiments of FIGS. 1-4.

Although the helical coil form of a distributed RTD has been shown in FIGS. 7 and 8 and alternatively described utilizing a heater wire core 71 with no heater filaments in the coiled linear distributed RTD 72, it is to be understood that the heater wire core may be omitted and alternatively one of the self heated filament types of linear distributed RTD's of the invention employed as the coiled element. Or the coiled element could comprise both RTD and heater wires. There may be a small center core of electrically inert, flexible material and the RTD wire or RTD and heater wires may be spirally wound onto that center core. This end result can either be secured together by a bonding material as discussed with respect to FIGS. 1-4 or it can be protected by plastic or metal sheathing as discussed with respect to the embodiments of FIGS. 5 and 6.

RTD filaments of the invention may be energized by either a constant voltage source, a constant current source, or a constant power source, each of which are known to those skilled in the art. With a constant voltage source applied across the RTD filaments, the detection circuitry will be arranged to detect decreases in current through the RTD filaments resulting from increases in temperature sensed by the distributed RTD's of the invention, and conversely will detect increases in current resulting from decreases in temperature. With a constant current source applied through the RTD filaments, the detection circuitry will be arranged to detect increases in voltage across the RTD filaments resulting from increases in temperature sensed by distributed RTD's of the invention, and conversely will detect decreases in voltage resulting from decreases in temperature. For forms of the invention shown in FIGS. 1-8, such current and voltage responses for the respective constant voltage, constant power and constant current source circuits will be smooth, continuous and linear. In an alternative, but less preferred form, a constant temperature difference between the heated and unheated sensor can be arranged. The power, voltage or current necessary to hold a constant temperature difference is a measure of the media flow rate or liquid level in a liquid engaging system, such as in a tank.

An example of the electrical circuit to which the sensor of FIGS. 1-8 can be connected is shown in FIG. 9. This is a simplified constant current type detection circuit for use with matched pairs of distributed RTD's configured, for example, in accordance with any of FIGS. 1-8. The reference numeral 81 generally refers to a distributed RTD of the type discussed above, including RTD or sensor filament 82 and heater filament 83 which are thermally coupled as previously discussed. The unheated or reference distributed RTD is referred to by reference numeral 84 comprising RTD filament 85. The heater filament of the unheated distributed RTD sensor is not shown in the diagram because it is not electrically connected to the heater power source so it is not a factor in the electronic circuit of FIG. 9. It should be understood that the reference sensor would normally include a heater filament even though it is not connected so that distributed RTD 84 is, for reference purposes, an exact thermal, electrical and mechanical counterpart of heated distributed RTD 81. Heater filament 83, one end of which is grounded, is electrically energized through conductor 86 by electrical power source 87 which may be either a constant current source, a constant voltage source or a constant power source and is connected to a power source represented by battery 88. Alternatively, the heater may be connected to a variable power source and varied so that a constant temperature difference is maintained in the RTD. The amount of power required is a function of the cooling and, for example, could be related to the amount of flow being experienced in the duct of FIG. 11 or the amount of fluid in the tank in FIG. 10.

The ungrounded ends of RTD sensor filaments 82 and 85 are connected through respective conductors 91 and 92 to a pair of balanced precision constant current sources 93 and 94 which are both in turn connected to a power source represented as battery 95. The outputs of RTD filaments 82 and 85 are connected through respective conductors 96 and 97 to the inputs of instrumentation amplifier 101. This amplifier is preferably a precision differential amplifier having its output 102 connected to input 103 of signal processor 104. The signal processor may be any conventional microprocessor with adequate related performance. The output of signal processor 104 is connected to output circuits 105 and 106 which drive suitable display or recording instrumentation. The instrumentation is not pertinent to this invention and therefore is not shown here. However, the instrumentation may provide means to record or visually indicate, or both, the condition calculated from the outputs of the RTD sensors or it may provide control signals to cause something to happen such as turning devices on or off, changing liquid level or a host of other possibilities.

It should be realized that conductors 91 and 92 may be up to several hundred feet long. Conductors 96 and 97 may be connected at any place along the length of conductors 91 and 92 but are preferably connected near sensor filaments 82 and 85 as shown. In the self heated RTD embodiment, heater filament 83 would not be part of the circuit.

Distributed RTD's according to the invention may be made as long as required or be other than straight, as discussed below, for spanning any particular field or zone, and if desired could be as long as several hundred feet. The cross-sectional dimension of distributed RTD's according to the invention, on the other hand, may be extremely small, as for example having an external diameter in the range of from approximately 0.010 inch (0.254 mm) to approximately 0.030 inch (0.762 mm). Distributed RTD's according to the invention will generally be provided with a length that is greater than approximately 100 times its diameter, and in most instances it will be provided with a length that is hundreds, or even thousands, of times greater than its diameter.

The forms of distributed RTD's shown in FIGS. 1, 2 and 5 which do not include a heater filament in association with the RTD wire is an accurate linear thermometer particularly adapted to measure the average temperature of a nonhomogenous or nonisothermal temperature field or zone. Examples of such fields or zones are a tank of liquid having stratified temperatures, and a flow pipe or duct with nonuniform temperature media flowing therethrough. One or more of the distributed RTD's may be deployed across such a nonisothermal temperature field to sense the average temperature of the field. In a situation such as a stratified tank of liquid where the stratification is normally in the horizontal direction only, a single one of the distributed RTD's may be utilized in a vertically oriented deployment, or a plurality of parallel vertically deployed distributed RTD's may be employed. In a situation where the isothermal temperature field is more complex in cross-section, not being regularly or predictably stratified, such as nonuniform temperature media flowing through a duct, a crossed matrix of two or more of the distributed RTD's may be employed. Other nonuniform distribution of the RTD or the RTD/heater combination as shown in U.S. Pat. No. 4,977,385 may also be used.

FIGS. 3, 4 and 6-8 illustrate heater-type distributed RTD's according to the invention which include parallel multi-strand filaments, one of which is an RTD wire filament and the other of which is a heater wire filament. Distributed RTD's of the invention which include a heater wire filament are adapted for making several different types of measurements. Perhaps the most widely useful deployment of heater-type distributed RTD's of the invention is to provide continuous gauging of the level or location of a phase change interface. This is typically the liquid level or interface between liquid and gas, but may also be a liquid-to-liquid interface between nonmiscible liquids, or the level of particulate matter in either liquid or gas. Another use of heater-type distributed RTD's of the invention is to measure the average mass flow velocity of gas flow in large ducts where a nonuniform flow velocity distribution is caused by flow disturbances from the presence of such fittings as tees, elbows, transitions, bends, section changes, louvers, dampers, fans, blowers and the like. Average mass flow velocity of any fluid, whether gas or liquid, in any conduit can be measured by the heater-type distributed RTD's of the invention. The manner in which these heater-type distributed RTD's are utilized to gauge liquid level and measure average flow velocity in a duct will be described in detail hereinafter. Other related information is provided in U.S. Pat. No. 4,977,385.

Heater-type distributed RTD's of the invention may also be used for sensing the average temperature of a field or zone in the same manner as described above for the nonheater form of the invention by simply not electrically connecting the heater element or elements to a source of current or voltage. In the preferred form of the invention an unheated distributed RTD would be used in conjunction with a heated distributed RTD. The unheated RTD is normally referred to as the reference RTD. In a constant temperature field, no reference RTD would be required. In a uniform (non-stratified) varying field a point RTD could be used.

The sensors of this invention will normally be employed in pairs, one being an unheated reference RTD while the other is the heated sensing RTD. Distributed RTD's constructed in accordance with this invention may be used in differentially heated (gaseous or liquid) fluid flow sensors, meters and the like, or may be used for liquid level sensing, all for use in relatively low temperature, non-hostile applications. With respect to the embodiment of FIGS. 1 and 2, where the RTD sensor is self-heated by forcing a low level current through it, two such sensors would be used as indicated by the circuit of FIG. 9, creating an electronic comparator circuit that, for example, maintains a fixed temperature difference between the self heated and the unheated reference RTD. When used for either determining flow rate of the media being sensed or gauging liquid level in a storage tank, the quality being measured by the RTD sensors measures the power required to maintain the differential temperature as a constant.

The sensors of the other embodiments, FIGS. 3-8, would all be used in the same way, that is, in pairs, one of them being heated and the other providing a reference signal output. In the embodiments having separate heater wires, only one of them is connected to a power source at one time and the heater wire in the unheated or reference sensor is not energized unless the first heater wire fails. In that case the sensors may be interchanged and the former reference sensor with the intact heater wire can be connected to the terminal formerly connected to the heater sensor and the heater. Thereafter the formerly active sensor with the now inoperative heater wire is connected to the terminals previously used by the reference sensor. The function of the unconnected heater wire is to ballast the reference sensor with the same amount of thermal mass as has the heated sensor so that even though the two sensors are at different temperatures they will maintain the same temperature difference when transient media temperature changes occur. This is an important feature in maintaining accurate indication in flow or fluid level in a tank during periods of rapid change in the sensed media temperature.

It is possible to employ a sensor of the type shown in FIG. 1 or FIG. 5 as a mate to a sensor having separate heating wires as shown FIG. 3 or FIG. 6. It would be somewhat less expensive to manufacture such a device but the rate of heating and cooling of the two otherwise identical RTD sensors would be different {absent the heater wire(s)} in the presence of changing media temperatures Therefore, under present circumstances, it is preferred to use two identical sensors connected to the sensing circuitry of FIG. 9.

Figure 10:
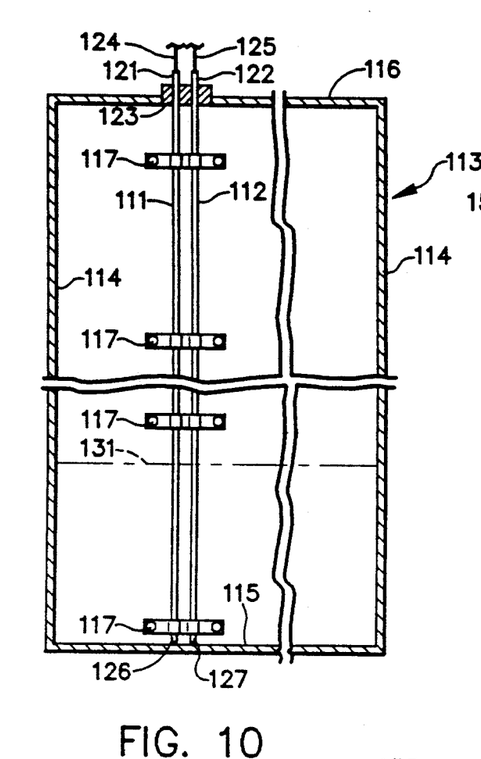
FIG. 10 is a simplified fragmentary vertical section illustrating a tank with a matched, parallel pair of distributed RTD's of the invention vertically deployed along a wall of the tank for liquid level gauging.

Referring to FIG. 10, distributed RTD's of the heater types according to the invention are deployed in matched parallel, vertical pairs for liquid level sensing. These are preferably of the types shown in FIGS. 3, 4 and 6-8. FIG. 10 shows a simplified embodiment for a tank of uniform cross section. For tanks of non-uniform cross section, extra lengths of the distributed RTD may be deployed proportional to the cross sectional area of the tank. Other examples of liquid level sensing distributed RTD's are described in U.S. Pat. No. 4,977,385.

The RTD's in the matched pair of distributed RTD's are designated 111 and 112. For maximum sensitivity and resolution, they could be the coiled version of FIGS. 7 and 8. The pair of distributed RTD's 111 and 112 is deployed vertically in closely spaced, parallel relationship inside tank 113 having side wall 114, bottom wall 115, and top wall 116. A series of mounting brackets 117 supports the two distributed RTD's within the tank spaced inwardly from mounting wall 114. Upper end portions 121 and 122 of RTD's 111 and 112 respectively extend upwardly beyond top wall 116 through a panel or plug member 123 set in the top wall. This makes the stranded lead wires 124 and 125 of the two RTD's 111 and 112 accessible above top wall 116. Lower ends 126 and 127 of the RTD's may be disposed as closely as desired to bottom tank wall 115. Reference is again made to U.S. Pat. No. 4,977,385.

To operate the pair of distributed RTD's for gauging liquid level in tank 113, the heater filament of one of the RTD's is energized, while the heater filament of the other RTD is left unenergized. Assuming there is quiescent liquid in the tank up to a level such as that designated by phantom horizontal line 131, and still air in the rest of the tank above the liquid, the relatively high density, high heat transfer liquid will disperse heat away from the wetted portion of the heated distributed RTD much more efficiently than the relatively poor thermal dispersion rate of air for the unwetted portion. Preferably, sufficient current or voltage is supplied to the heater filament of the heated RTD sensor to heat the portion of it that is in air to a differential temperature of, for example, approximately 100° F. above the temperature of the unheated RTD sensor which serves as a reference. The much more efficient thermal conductivity of the quiescent liquid will cool the immersed portion of the heated RTD to a differential temperature on the order of only about 10° F. above the unheated reference RTD. As the liquid level progressively rises in tank 113, a progressively greater length of the heated RTD is cooled off to the approximately 10° F. temperature differential and a progressively shorter length of the heated RTD will still have the high, approximately 100° F. temperature differential. Conversely, as the liquid level drops in the tank, a progressively greater length of the heated RTD will be uncovered and therefore subject to the high temperature differential of approximately 100° F.. At the same time a progressively shorter length of the heated RTD below liquid level 131 will be cooled to the low, approximately 10° F., temperature differential.

The resulting continuous variation of electrical resistance in the heated or self heated RTD relative to the electrical resistance in the unheated RTD relating to variations in liquid level in the tank will permit good accuracy, high resolution, smooth, continuous, linear, nonstepped gauging and analog reading of liquid level in the detection circuitry and instrumentation electrically connected to lead wires 124 and 125 of the two continuous RTD's. Such high accuracy, resolution and continuous gauging not only enable the exact liquid level to be determined at any time, but also enable liquid level changes to be immediately sensed, as compared with prior art point sensing systems which could allow a considerable liquid level change to occur without detection. This also avoids the large time and economic costs associated with the many connections required to be made when multiple individual point sensors are employed.

In the event the liquid and/or air in the gauged vessel may be turbulent rather than quiescent, then greater cooling of heated distributed RTD 111 or 112 will be caused by the turbulence, and the aforementioned 10° F. and/or 100° F. temperature differentials will be correspondingly decreased. If the turbulence is constant, the system can be calibrated in an equally turbulent environment, and provide readouts of satisfactory accuracy. On the other hand, if the turbulence is randomly varying such that variable values of cooling occur, the system can produce errors in the readout caused by the random turbulence. If such is the case, then a still well or stilling well can be provided which surrounds at least the heated distributed RTD, and preferably both the heated and unheated RTD's so that it can also serve as a support for both, to mitigate the effects of the varying turbulence in the liquid and the gas phases. In tanks such as spherical ones or cylindrical tanks mounted on their sides, RTD's with non-uniform distribution may be employed to take into account the large volume of liquid per unit of height that occurs near the vertical center of the tank as opposed to the lesser volume of liquid per unit of height near the top and bottom of the tank. Once again, examples are given in U.S. Pat. No. 4,977,385 for another distributed RTD.

Figure 11:
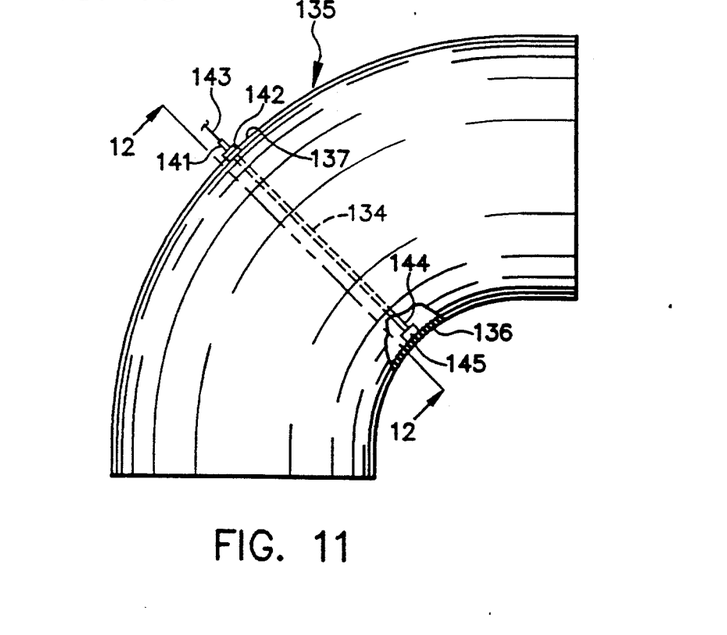
FIG. 11 is a sides elevational view, with a portion broken away, illustrating a duct elbow with a matched pair of distributed RTD's of the invention deployed across it.
Figure 12:
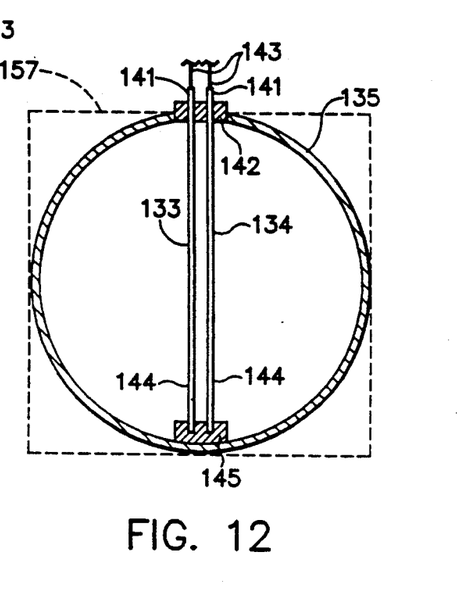
FIG. 12 is a simplified transverse sectional view taken on cutting plane 12—12 in FIG. 11, with the diameters of the distributed RTD's exaggerated relative to their lengths for illustrative purposes.

FIGS. 11 and 12 illustrate use of a matched pair of distributed RTD's according to the invention to measure the average mass flow in a duct where a flow of nonuniform distribution exists which may be created, for example, in air ducts where diameters are large and fittings such as tees, elbows, transitions, bends, section changes, louvers, dampers, and the like cause flow disturbances. Another example of a large duct where it would be desirable to measure the average mass flow velocity or rate is the input air duct to or the combustion products output duct from a fossil fuel power plant, or both. The RTD's in the matched pair of distributed RTD's in FIGS. 11 and 12 are designated 133 and 134, and these are heated type RTD's as previously described. RTD's 133 and 134 are shown deployed in spaced, parallel relationship to each other diametrically across air duct elbow 135 in the direction from the smallest radius of curvature at inside 136 of the duct bend to the largest radius of curvature at outside 137 of the duct bend. This orientation is chosen because the RTD's are arranged in the direction of greatest nonuniformity of flow distribution but symmetrical in the normal axis. Other symmetrical positions in the duct are possible and may be preferred as the case-by-case conditions may indicate. The structure shown in FIG. 12 is a simplified embodiment. In the preferred form two RTD's would be arranged so that the length of the sensing RTD material at any location would be proportional to the area of the duct being interrogated or alternatively in proportion to the flow rate at each location. Again, examples are disclosed in U.S. Pat. No. 4,977,385 with a different distributed RTD.

Front end portions 141 of the distributed RTD's which carry the lead wires extend externally of the wall of the duct through a suitable support body or connector plug 142 in the region of the outer curvature 137 of the elbow, with lead wires 143 accessible for connection to the detection circuitry and current or voltage source. Rear end portions 144 of the RTD's are secured by a suitable internal support body 145 in the region 136 of the inner curvature of the elbow.

The heater filaments of one of distributed RTD's 133 or 134 are energized, and the heater elements of the other are not, the unheated RTD serving as a reference. The flowing air cools the heated RTD sensor as a function of the mass flow rate passing the heated RTD. Relatively high flow rates near the longer outer curvature region 137 of the elbow will cool that portion of the heated RTD to a greater degree than the cooling that will occur near the shorter inner curvature region 136 of the elbow. The resulting sensed output of RTD filaments in the heated distributed RTD as compared to the sensed output of the unheated RTD filaments will provide an excellent summation and average of the mass flow rate passing the matched pair of distributed RTD's. Naturally, it is necessary to distribute the RTD's so that no one area of the duct cross section is unduly influenced.

Figure 13:
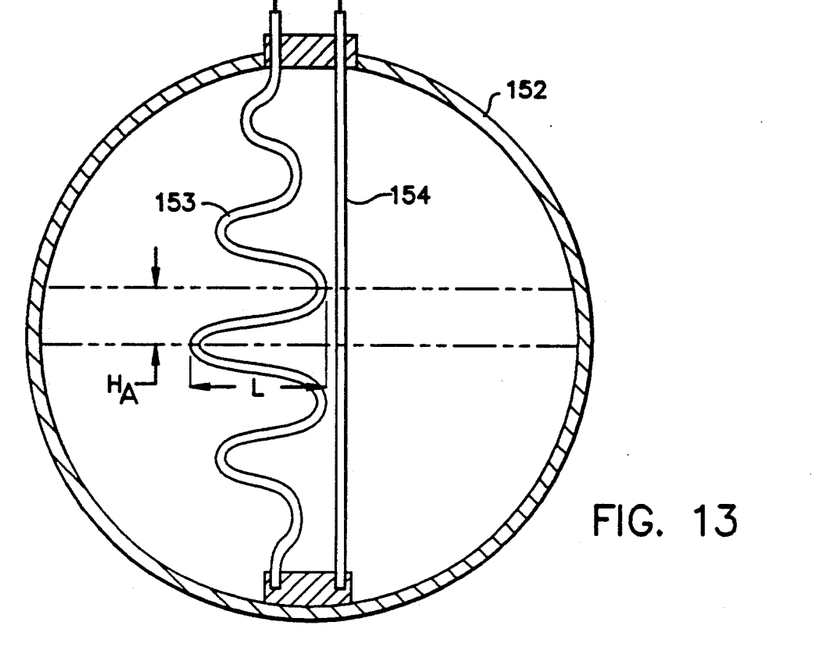
FIG. 13 is a simplified transverse sectional view similar to FIG. 12 showing the distributed RTD's of this invention arranged to provide a variable function response corresponding to the variable diametrical area of the fluid flow in the duct elbow.

The uniform distribution for the RTD as shown in FIG. 12 would be most appropriate if the duct were rectangular, as shown by dotted lines 157. Several examples are given in U.S. Pat. No. 4,977,385 for optimum distribution of the sensor in non-rectangular ducts. The configuration of the RTD shown in FIG. 13 is one method of giving proper influence to variations in duct elbow cross section. Duct 152 is fitted with the heated RTD 153 and reference RTD 154. Heater RTD 153 is shown in a varying sinuous configuration. The extra length of the heated RTD is positioned in the center of the duct because more area at that location represents more potential flow. The lateral length L of the loops is proportional to the area $H_4$ between the dotted lines. Similar spacing from the center outward results in less area and therefore shorter lateral sensor loops. Thus the influence of greater potential flow area is recognized and compensated for by locating extra heated sensor length in the central portion than in the less influential outer reaches.

Figure 14:
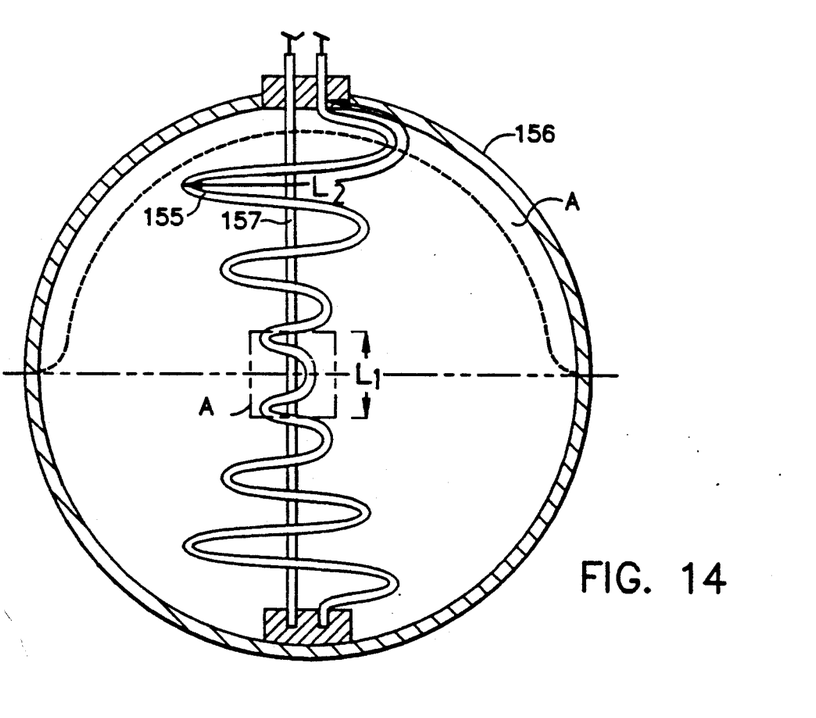
FIG. 14 is a sectional view similar to FIG. 13 with the distributed RTD's located in a straight section of the duct.

The above is true only when the distributed RTD sensor arrangement is located in an elbow. If it were placed in a long straight duct it would be appropriate to form the RTD arrangement shown in FIG. 14. Here more RTD length 155 is in the outer areas closer to the duct walls 156 than in the center. That is because, for example, one inch of radius at the inner periphery of the duct ($A_2$) represents more potential flow volume than one inch at or near the center ($A_1$). That relationship, shown in FIG. 14, is represented by the following equation:

$$\frac{L_2}{A_2} = \frac{L_1}{A_1}$$

where $L_1$ and $L_2$ are the RTD lengths in respective areas $A_1$ and $A_2$. Reference RTD 157 is shown in FIG. 14 as though positioned closely upstream or downstream from the sinuous heated RTD.

If additional flow rate information is desired for the summing and averaging of the flow rate in the duct elbow, one or more additional matched pairs of spaced, parallel heated distributed RTD units may be deployed across the elbow, in close to the same transverse plane across elbow 135, but offset angularly as viewed in FIG. 12 from pair 133 and 134 of RTD's Alternatively, if desired, a gridwork of crossing matched pairs of distributed RTD's might be deployed across the duct elbow.

Should the mass flow rate be so high as to cool heated RTD 133 or 134 to such a degree as to saturate its signal output, that is, where increased flow rate causes little or no additional cooling, a shroud can be provided to increase the usable range. The shroud proportionally reduces the rate at which heat is dispersed from the heated distributed RTD into the flowing stream.

Utilization of a matched pair of heater-type distributed RTD's of the invention in each of the liquid level gauging and mass flow rate sensing serves two purposes. First, the unheated distributed RTD, by having identical components as the heated distributed RTD, has an identical thermal response to the environment other than that response which is the result of energizing the heater, so that a true differential temperature response is provided by comparison of the output of the RTD filaments of the heated RTD relative to the output of the RTD filaments of the unheated RTD. Second, as discussed above, with the two matching distributed RTD's, if the heater should fail in one of them, then the heater of the other one may alternatively be energized. In this manner, only the external electrical connections need be changed, which can be done at the location of the detection circuitry. Then the formerly heated RTD sensor will serve as the reference sensor RTD sensor, and the difficulty and expense of replacing the damaged RTD sensor is avoided.

Figure 15:
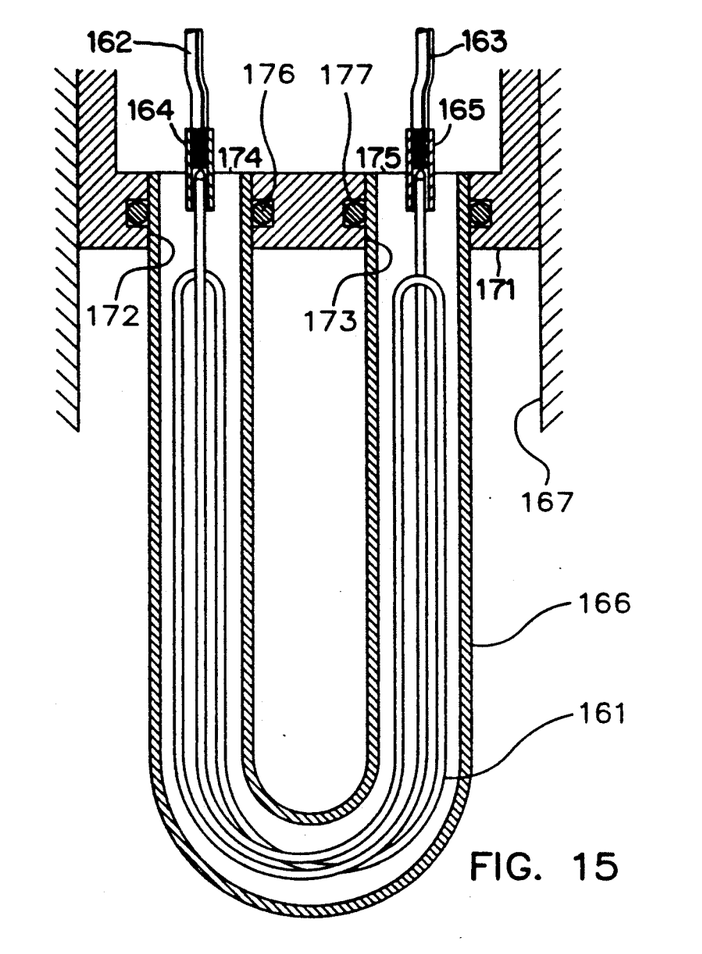
FIG. 15 shows an alternative embodiment of the sensor of the invention as it could be mounted for use.
Figure 16:
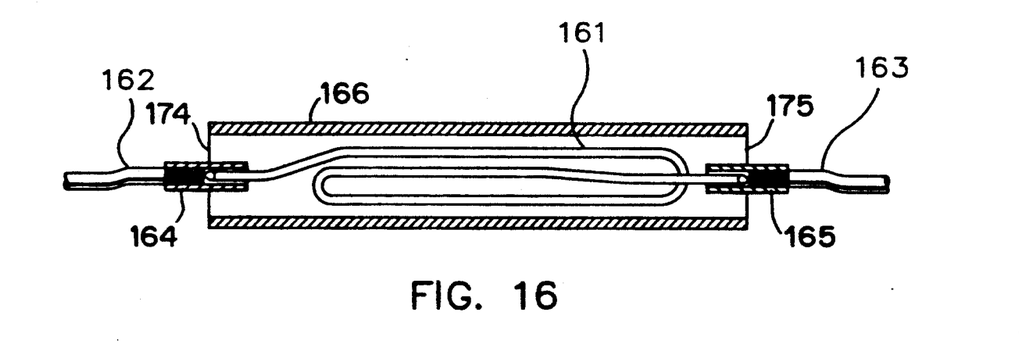
FIG. 16 shows the sensor of FIG. 15 in a preliminary form.

Another alternative sensor embodiment is shown in FIGS. 15 and 16. This sensor, when mounted as shown in FIG. 15, can perform the desired RTD functions without a need for plug 42 or 65 as shown in FIGS. 5 and 6. RTD sensor wire 161 is connected at either end to stranded lead wires 162 and 163 by appropriate means such as welding, and the joint is encapsulated as before by means of small tubing elements 164 and 165. The entire length is encased in tube 166, which may be metal as before, or any other suitable material. That tube is shrunk or drawn over the RTD wire as described with respect to embodiments described above.

Once the straight piece is fully formed to its final size, it is bent into a U-shape as seen in FIG. 15 and mounted into cylindrical opening 167. Plug element 171 is fitted into the opening 167 and is formed with openings 172 and 173 which receive the open ends 174 and 175 of the sensor. O-rings 176 and 177 provide the seal between sensor tube 166 and plug 171. The ends of the tube may be secured in the plug openings by any suitable means such as by an adhesive, a compression fitting or by welding, among others.

As discussed previously, the RTD in the FIGS. 15 and 16 embodiment may be self heated as in FIG. 5, or there may be a separate heater wire as in FIG. 6. Because of the completeness of the disclosure of the embodiments of FIGS. 1-6 it is not believed to be necessary to further describe these alternatives or the uses to which this sensor can be put.

In instances where this U-shaped configuration can be employed, there is no need for the seal plugs shown in FIGS. 5 and 6. This simplifies the structure in some ways. Further, the embodiment of FIGS. 15 and 16 could be similar to FIG. 1 but with connections at either end to a short protective sheath, similar to sheath 21 in FIG. 1, which would be mounted in openings 172 and 173 in plug 171 in opening 167.

One of the significant advantages of this invention is low cost of construction, at least partially related to the simplicity of forming the sensor. The FIG. 2 embodiment can be made by winding insulated wire back and forth between two pegs arranged so that an RTD sensor of the desired length or passes will be made. The number of lengths and the gauge of the wire will determine the nominal or room temperature direct current resistance. The stranded lead wires can be attached by welding, soldering or other common means and short pieces of shrink tubing are placed over the bare conductors. The short tubes are then heated and fixed in place. The heater wire is prepared much the same as the RTD wire and may be done simultaneously to facilitate intermingling. Of course, it is not necessary that the wires be intermingled in the sensor. Preferably a slow setting rubbery sealant is coated onto the stranded wires of the FIG. 2 embodiment and the wires are pulled into the shrink tubing. Alternatively, potting compound such as rubber, epoxy or other flexible material can be forced under pressure into one end of the shrink tubing prior to shrinking the outer sheath. The seal plug is placed in the open end of the tubing and heat is then applied to shrink it down onto the sensor and heater wire, connectors and the seal plug. Any surplus of the rubbery sealant is forced out of the open end of the shrink tube and disposed of. The wire may be conventional ML insulated copper wire. Such wire has been insulated with varnish in the past but a dispersion coating of a polyimide provides a coating more resistant to abrasion and heat.

For higher temperature applications the wire can be insulated with a ceramic coating and a slow setting liquid phase ceramic potting compound could be used in conjunction with a metal sleeve. The metal sleeve would be drawn down to compact the wire array before the ceramic potting sets up.

In this manner, the heated RTD sensor is formed which can be strategically located within a tank, pipe or duct and used to detect liquid level or flow rate as previously described.

Alternatively, the shrink tubing of FIG. 6 can be replaced with a metal tube as shown in FIG. 5. This tube may be drawn down in successively smaller dyes until the wires are firmly packed inside the metal sheath. Other methods of reducing the metal tube diameter have been discussed. The seal plug can be welded in place in either the metal sheathed case or captured in the shrink tube assembly to form a hermetically sealed end for exposure to the media.

In another version of the sensing system, the sensor instrument of FIG. 1 may be employed alone in either a storage tank to determine liquid level or in an irregular duct where an irregular or variable flow pattern or both occurs. In this configuration, it is assumed that small temperature changes occur in the process media and therefore a second or reference sensor need not be employed. In this case, a fixed amount of heater power would be impressed on the sensor wire and the flow rate or liquid level can be determined by relating the cooling experienced to the amount of cooling caused by predetermination of the media condition under known conditions.

Additionally, it is possible that the instrument of either of the embodiments discussed above can be combined with any other type of temperature sensors such as a thermocouple, a customary point sensing RTD, temperature transmitters or temperature sensing strain gauges to name just a few. This arrangement would be most economical if one point in the media is equal to or consistently representative of the media temperature throughout the tank, duct, boiler or any manner of vessel or weir. If the reference temperature is being employed to satisfy the user by any of the point sensing means mentioned above, the distributed RTD can be heated by a fixed amount and the differential temperature measured or a constant differential temperature and variable heater power applied and measured for the determination of the media condition.

As an alternative to using point type sensors, a device constructed in accordance with FIG. 1 can be formed with substantially reduced lengths for use with longer lengths of either the FIG. 1 or the FIG. 3 embodiments. The use of sensors constructed in accordance with this invention but in very short lengths would be equivalent to the point sensors mentioned above and would be used to sense the media temperature.

A further alternative embodiment would employ braided sheathing material, either metal or plastic, in place of the shrink tubing of FIG. 6 or the thin wall metal tubing of FIG. 5. Metal sheathing either in the braided or tube version would likely be employed to electrically shield the sensor from magnetic or electric field effects.

As a further alternative, any of the arrangements discussed above can be employed wherein only a single self heated RTD wire is used in either a metal or a polymer sheath. The same RTD can be periodically heated and allowed to cool. By this means, one RTD wire can serve as both the reference and the heated RTD as well as serving the purpose of the heater. The RTD wire would, in effect, be employed in a time-shared manner for more than one purpose. Referring to FIG. 9, only one of RTD filaments 82, 85 would be used. In that case line 108, for example, from signal processor 103 to constant current source 94 would be activated to cause filament 85 to alternatingly heat and cool.

In view of the above description it is likely that improvements and modifications will occur to those skilled in the art which are within the scope of the appended claims.

What is claimed is:

1. A distributed resistance temperature sensor for interrogating an extended field, said sensor comprising:
   elongated resistance temperature detector (RTD) wire means having an insulative coating thereon and formed in a U-shaped configuration;
   means adapted for connecting the ends of said RTD wire to detection circuitry and to an external source of electrical power; and
   means for heating said RTD wire.

2. The resistance temperature sensor of claim 1, wherein said RTD wire means comprises a multiplicity of interconnected segments, the terminal ends of said RTD wire means being adjacent each other at each end of said U-shaped configuration.

3. The resistance temperature sensor recited in claim 1, wherein said heating means comprises insulatively coated, elongated heater wire means parallel to and closely adjacent said RTD wire means.

4. The resistance temperature sensor recited in claim 3, wherein said heater wire means comprises a plurality of interconnected segments.

5. The resistance temperature sensor recited in claim 2, wherein said heating means comprises a plurality of interconnected segments of insulatively coated, elongated heater wire parallel to and closely adjacent said RTD wire segments.

6. The resistance temperature sensor recited in claim 1, wherein said heating means comprises said RTD wire means which is self heating when connected to said source of electrical power.

7. The resistance temperature sensor recited in claim 1, and further comprising a protective sheath closely encasing said RTD wire and said heating means.

8. The resistance temperature sensor recited in claim 7, wherein said sheath is comprised of a thin metal tube.

9. The resistance temperature sensor recited in claim 7, wherein said sheath comprises plastic shrink tubing.

10. The resistance temperature sensor recited in claim 3, and further comprising a protective sheath closely encasing said RTD wire and said heater wire.

11. The resistance temperature sensor recited in claim 6, and further comprising means adapted to be coupled to said circuitry for alternatingly heating and not heating said RTD wire, whereby said RTD wire serves as a reference RTD, as a heated RTD and as a heater.

12. The resistance temperature sensor recited in claim 1, and further comprising a protective sheath secured closely around said connecting means.

13. The resistance temperature sensor recited in claim 12, wherein said protective sheath is a thin metal tube.

14. The resistance temperature sensor recited in claim 12, wherein said protective sheath is plastic shrink tubing.

15. The resistance temperature sensor recited in claim 2, wherein said interconnected segments of said RTD wire are parallel to one another and are secured together to form a unitary, self supporting structure.

16. The resistance temperature sensor recited in claim 15, wherein said RTD segments are secured together by means of a bonding material.

17. The resistance temperature sensor recited in claim 5, wherein said parallel segments of RTD wire and heater wire are secured together to form a unitary, self supporting structure.

18. The resistance temperature sensor recited in claim 17, wherein said parallel segments of RTD wire and heater wire are secured together by means of a bonding material.

* * * * *